United States Patent [19]

Aronov

[11] Patent Number: 4,703,024
[45] Date of Patent: Oct. 27, 1987

[54] METHODS FOR IMPROVING MECHANICAL PROPERTIES OF PARTIALLY STABILIZED ZIRCONIA AND THE RESULTING PRODUCT

[76] Inventor: Victor A. Aronov, 8620 Waukegan Rd., Morton Grove, Ill. 60053

[21] Appl. No.: 833,817

[22] Filed: Feb. 26, 1986

[51] Int. Cl.$^4$ .............................................. C04B 35/48
[52] U.S. Cl. .................................... 501/103; 501/104; 501/105; 264/64; 264/346
[58] Field of Search ............................. 501/103–105; 264/64, 346

[56] References Cited

U.S. PATENT DOCUMENTS

| | | | |
|---|---|---|---|
| 2,937,102 | 5/1960 | Wagner | 106/57 |
| 3,620,781 | 11/1971 | Garvie | 501/104 |
| 4,067,745 | 1/1978 | Garvie et al. | 501/104 |
| 4,279,655 | 7/1981 | Garvie et al. | 264/65 X |
| 4,298,385 | 11/1981 | Claussen et al. | 501/105 |
| 4,322,249 | 3/1982 | Claussen et al. | 501/88 |
| 4,344,904 | 8/1982 | Yamada et al. | 501/104 X |
| 4,360,598 | 11/1982 | Otagiri et al. | 501/103 |
| 4,525,464 | 6/1985 | Claussen et al. | 501/104 X |
| 4,544,607 | 10/1985 | Kaneno et al. | 428/472 |
| 4,548,798 | 10/1985 | Rice | 423/263 |

OTHER PUBLICATIONS

"An Introduction to Zirconia", by R. Stevens (Magnesium Elektron Ltd., Publication No. 113, Jun. 1983.
"Long-Term Stability and Properties of Zirconia Ceramics for Heavy Duty Diesel Engine Components", by D. C. Larsen and J. W. Adams (IITRI Report, NASA, Lewis, 1985.
"Nilsen Sintered Products-PSZ-The Die That Puts New Life Into Your Plant", (Brochure of Nilsen Sintered Products (Aust) Pty. Ltd.)
"Property Screening and Evaluation of Ceramic Turbine Materials", by D. C. Larsen and J. W. Adams (IITRI Report, AFWAL-TR-83-4141, 1984, p. 270).

*Primary Examiner*—William R. Dixon, Jr.
*Assistant Examiner*—Karl Group
*Attorney, Agent, or Firm*—Willian Brinks Olds Hofer Gilson & Lione Ltd.

[57] ABSTRACT

A body of monolithic or composite partially stabilized zirconia is subjected to intense surface heating which raises the temperature of the exposed surface to 1100° C.–1600° C. without heating the interior of the body above 600° C.–800° C., and then the body is cooled. The heat treated body shows increased wear resistance and surface hardness as compared with an untreated body.

25 Claims, 4 Drawing Figures

METHODS FOR IMPROVING MECHANICAL PROPERTIES OF PARTIALLY STABILIZED ZIRCONIA AND THE RESULTING PRODUCT

BACKGROUND OF THE INVENTION

This invention relates to methods for improving surface mechanical properties such as hardness and wear resistance of materials incorporating partially stabilized zirconia.

Partially stabilized zirconia ("PSZ") is a ceramic with unusual properties that make it attractive for a number of commercial applications. The review article "An Introduction to Zirconia" by Dr. R. Stevens (Magnesium Elektron, Ltd., Publication No. 113, June, 1983) provides an overview of PSZ and its properties.

Briefly, zirconia exhibits three well-defined crystalline phases or lattice modifications: the monoclinic, tetragonal, and cubic phases. The monoclinic phase is stable up to about 1170° C., at which point it transforms to the tetragonal phase. The tetragonal phase is stable up to 2370° C., at which point it transforms to the cubic phase. The cubic phase is stable up to 2680° C., the melting point. The monoclinic phase has a lower density than either the tetragonal or cubic phase, and the transition from the tetragonal to the cubic phase results in a volume increase of three to nine percent. As explained below, this volume expansion has been used to improve the mechanical properties of zirconia.

PSZ is obtained by mixing zirconium dioxide with a stabilizing additives such as MgO, CaO, $Y_2O_3$, or other rare metal oxides, which increase the stability of the cubic phase at room temperature. PSZ is usually made up of two or more intimately mixed phases, and can include a mixture of all three phases.

Several approaches to toughening PSZ are described at Section 5 of the above-identified Stephens article, including stress induced transformation toughening (Sections 5.2 and 5.3). In this approach, particles of metastable tetragonal phase PSZ are introduced into a ceramic body, either during initial fabrication or by heat treatment during or after sintering. Surface grinding is then used to create stresses in a surface layer, which cause the tetragonal phase particles to transform to the monoclinic phase. This transformation generates large compressive surface layer stresses which increase the toughness and strength of the surface layer. In many applications, such surface grinding can bring disadvantages, because it alters the exterior dimensions of the article being processed. For this reason, molding techniques cannot be used to form articles to finished dimensions when surface grinding is required to obtain desired surface mechanical properties of the article. Also, surface grinding is not suitable for all potentially useful surface contours.

A second approach is to anneal or age PSZ at elevated temperatures in order to obtain a desired crystalline structure. Garvie U.S. Pat. Nos. 4,067,745, 4,279,655, and 3,620,781, disclose a number of such aging processes, in which PSZ is aged at elevated temperatures for time periods ranging between 0.5 hour and 40 hours. Similarly, Yamada U.S. Pat. No. 4,344,904 discloses a process in which PSZ is annealed at an elevated temperature for 1-3 hours. Claussen U.S. Pat. No. 4,525,464 discloses a process in which PSZ is annealed for two hours to eliminate the monoclinic phase in a surface layer.

The processes described in these patents are directed to bulk heating steps in which heating is not limited to a surface region. Furthermore, the object of the Garvie and Yamada processes is to alter the crystalline form of the bulk of the article. The Claussen process attempts to eliminate the monoclinic phase in the surface layer. In all of these respects, the Garvie, Yamada and Claussen processes differ significantly from the present invention.

SUMMARY OF THE INVENTION

The present invention is directed to an improved method of surface treating PSZ which avoids the disadvantages of surface grinding, yet which significantly increases wear, erosion, and cavitation resistance of the surface. This invention is also directed to the resulting product.

According to this invention, a rigid body which includes PSZ in a surface region is heat treated by subjecting the surface region to external heating such that the surface region is heated to an elevated temperature, preferably without heating the interior of the rigid body sufficiently to induce substantial phase transformations. The surface region is then cooled to cause a portion of the surface region to transform from the tetragonal to the monoclinic phase. This transformation results in a volume expansion in the surface region that creates a compressive surface field which increases the strength and the wear resistance of the surface region.

The temperature to which the surface region is heated should be chosen such that the desired amount of tetragonal-monoclinic transformation will be induced when the surface region is heated to the selected temperature and cooled. The process of this invention can be used either on monolithic PSZ or on composite materials made up of mixtures of PSZ with other materials, such as cubic zirconia or alumina, for example.

There are many ways of performing the external heating step, including directing radiant energy or particle beams against the surface being treated. UV, visible and IR energy can be used, as can electron, neutron, and ion beams, for example. If the surface being treated is sufficiently electrically conductive, high frequency induction heating is another alternative.

This invention provides important advantages in that the desired intensity surface compressive field is created without surface grinding. Articles can be molded to final dimensions and then treated to improve the mechanical properties of the surface without altering these dimensions significantly. Furthermore, the method of this invention can be used on articles with a wide variety of surface contours and finishes, including many which are not feasible to form by surface grinding methods.

The invention itself, together with further objects and attendant advantages, will best be understood by reference to the following detailed description.

DETAILED DESCRIPTION OF THE PRESENTLY PREFERRED EMBODIMENTS

Figure 1:
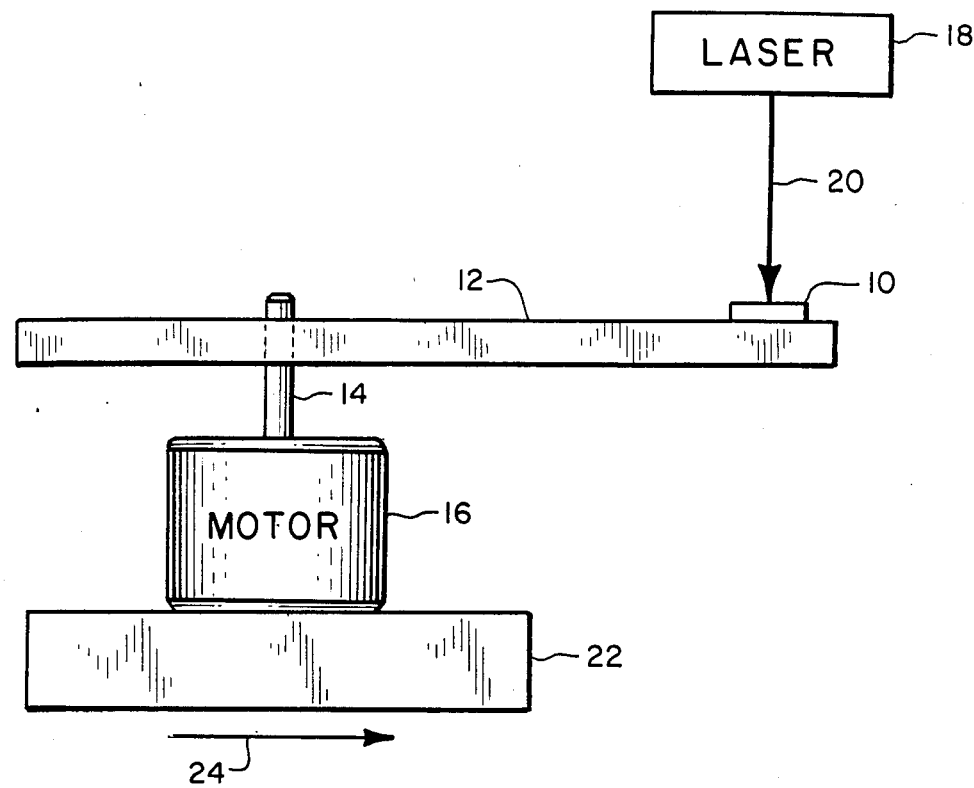
FIG. 1 is a schematic view of an apparatus used to perform a presently preferred embodiment of the method of this invention.

Turning now to the drawings, FIG. 1 shows an apparatus which has been used to heat treat PSZ to illustrate the method of this invention. In this example, PSZ test pieces 10 were subjected to intense surface heating resulting from laser illumination. The test pieces 10 were clamped to one end of an arm 12 that was secured to a shaft 14 of an electric motor 16. The electric motor 16 rotated the test piece 10 about a rotation axis defined by the shaft 14. A laser 18 projected an intense light beam along a beam axis 20 oriented parallel to the rotation axis. The motor 16 was mounted on a translation stage 22 that moved the motor 16 in a straight line in the direction indicated by the arrow 24. With each rotation of the arm 12, the laser beam illuminated a respective arc of the upper surface of the test piece 10, and translation of the motor 16 caused successive arcs to be displaced radially across the test piece 10.

In this example, the test piece was formed of monolithic PSZ stabilized with MgO obtained from NILSEN (U.S.A.) Inc., Glendale Heights, Ill., and identified as Grade No. MS. The dimensions of the test piece 10 were 20 mm in length (measured radially with respect to the rotation axis), 3 mm in width (measured tangentially with respect to the rotation axis), and 6 mm in thickness (measured parallel to the rotation axis). The exposed surface of the test piece 10 was used as obtained from the manufacturer, without alteration. This exposed surface of the unprocessed PSZ was analyzed with standard X-ray diffraction techniques and found to have the following crystalline structure: 58% cubic, 37% tetragonal, 5% monoclinic. In this example, the motor 16 rotated the arm 12 at 600 RPM, and the distance between the shaft 14 and the test piece 10 was 25 cm. The laser 18 was a $CO_2$ continuouse flow laser (15 Kw maximum power) which generated a beam 1 mm in diameter at a wavelength of 10.6 microns. The translation stage moved the motor 16 in the direction of the arrow 24 at a speed of 38 mm/min.

Four test pieces 10 were processed with the apparatus of FIG. 1 with a laser beam power of 0.1, 1.0, 2.5, and 4.0 Kw respectively. In each case, the entire upper surface of the test piece 10 was illuminated by the beam under ambient conditions. Then the upper surfaces of each of the four test pieces 10 and an untreated test piece were measured for wear and hard- ness.

Figure 2A:
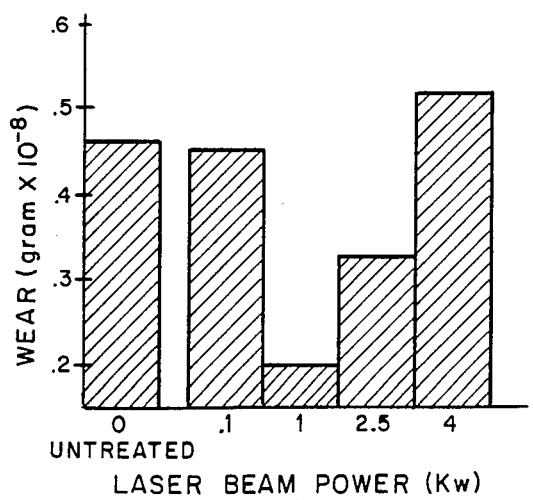
FIGS. 2a and 2b are graphs of wear and hardness of samples processed with the apparatus of FIG. 1.
Figure 2B:
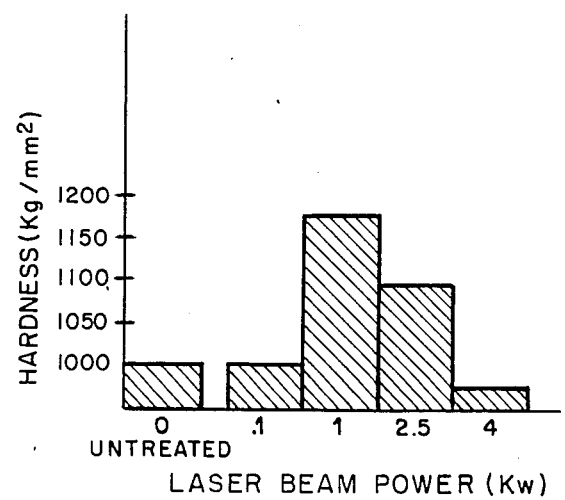

The results were graphed in FIGS. 2a and 2b. Wear as graphed in FIG. 2a was measured with a reciprocating motion apparatus in which the test piece was mounted on a reciprocating beam and an untreated sample of PSZ was mounted in a stationary holder. The treated surface of the test piece was pressed into contact by a dead weight with a portion of the untreated sample measuring 3 mm by 3 mm in size for a test period of three hours. The reciprocating beam was oscillated at a rate of 280 strokes/minute and the sliding speed reached a maximum value of 0.44 m/sec. at the center of each stroke. The interface pressure was $8.3 \times 10^6$ Pascals. During the experiment the surface was lubricated with base oil (oil without additives) at the rate of one drop per minute. Before and after each experiment, the test piece was cleaned with acetone in an ultrasonic cleaner for 15 minutes, dried, and weighed with an analytical precision balance (accuracy 0.1 mg). Wear was measured by the weight lost by the test piece. Hardness as graphed in FIG. 2b was measured using a Buehler Micromet II microhardness meter.

FIGS. 2a and 2b show that heating the surface of the test piece 10 significantly altered both the wear and hardness characteristics of the heated surface. In particular, at a laser beam power of 1 Kw, wear was reduced by almost a factor of five as compared with the untreated test piece, and surface hardness was almost four times greater than the untreated test piece.

Without intending to be bound to any particular explanation of the mechanism by which heat treating improves surface mechanical properties of PSZ, I believe that when a surface layer of PSZ is cycled in temperature from a temperature below 500° C. to a temperature in the range of 1100° C.–1600° C. and back, a portion of the tetragonal phase of PSZ in the surface layer is caused to transform to the monoclinic phase. Heating conditions are chosen to obtain the desired phase transformation in the surface layer without heating the body of the test piece sufficiently to induce significant phase transformations. Preferably, the temperature of the body of the test piece does not exceed 600° C.–800° C. Such heating conditions cause the volume of the surface layer to expand while the body of the test piece does not. This creates a strong compressive field in the surface layer which increases resistance to wear, erosion, cavitation, and other similar destructive processes.

Figure 3:
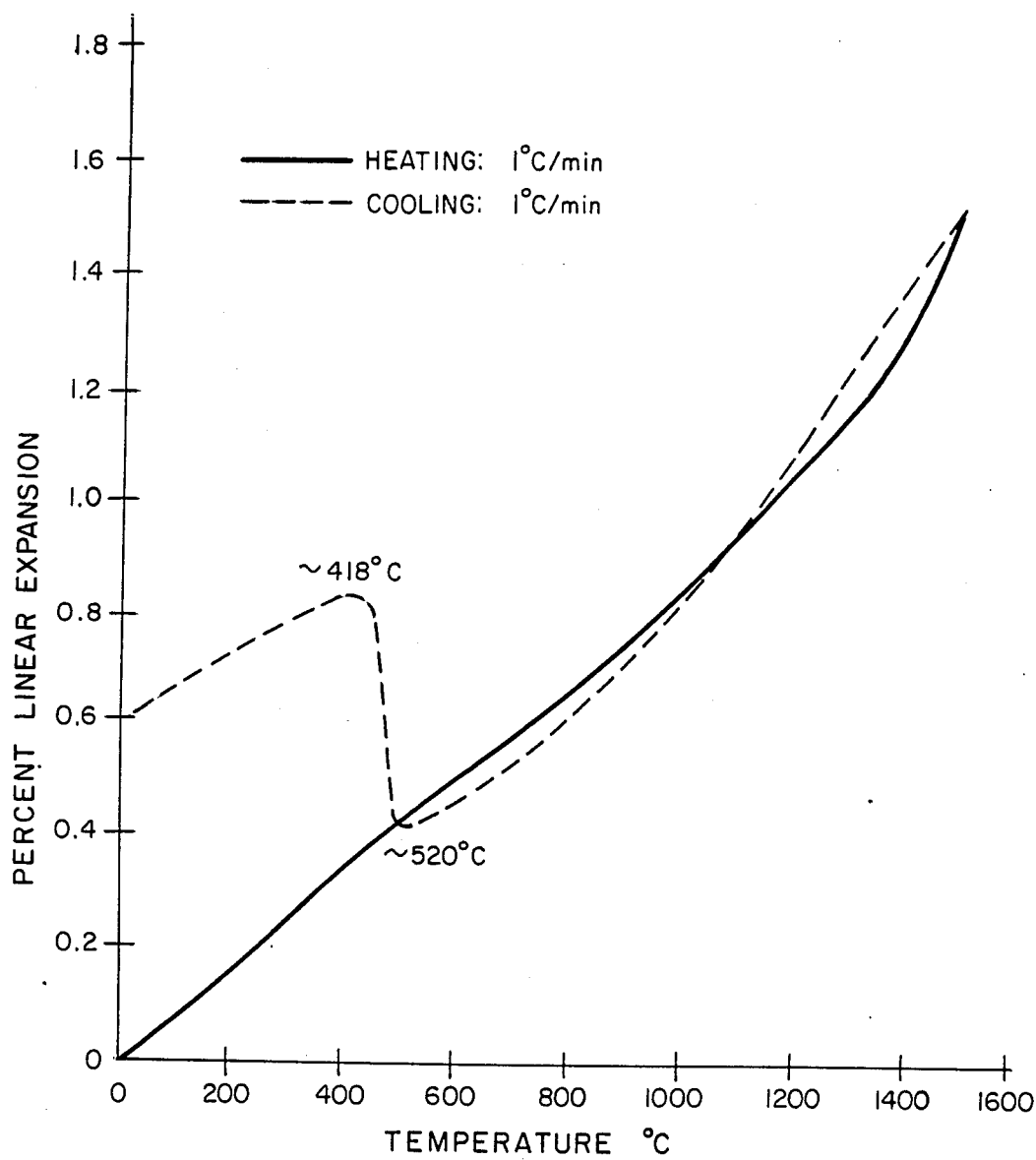
FIG. 3 is a graph showing the expansion of PSZ stabilized with MgO during heating and cooling.

FIG. 3 shows the percent linear expansion of PSZ stabilized with MgO of the same grade as used in the example described above as it is heated from ambient temperature to 1500° C. and then cooled to ambient temperature. ("Property Screening and Evaluation of Ceramic Turbine Materials" by D. C. Larsen and J. W. Adams, (IITRI Report, AFWAL-TR-83-4141, 1984, page 270)). As the heated PSZ cools below 520° C., it undergoes a sharp expansion as a portion of the tetragonal phase transforms to the monoclinic phase. It is this expansion that is thought to be important in obtaining the improved mechanical properties documented in FIGS. 2a and 2b.

As pointed out above, a number of methods can be used to heat the surface layer, including various types of radiant, particle beam and inductive heating. The term "external heating" is used in this specification and the following claims to include such heating methods and to exclude frictional heating. Thus, the term external heating is meant to exclude techniques such as surface grinding which impose high levels of surface stress on the workpiece. Stress induced phase transformation differs significantly from thermally induced phase transformation, and the term external heating is intended to focus on the latter while excluding the former.

As pointed out above, this invention is also directed to the novel product which can be produced with the methods described above. Preferred embodiments of this product are characterized by a higher percentage of monoclinic phase in a surface layer than in an interior region, by the surface layer being 5 percent to 100 percent in the monoclinic phase, and by the surface layer being subjected to a compressive field resulting from the greater percentage of the monoclinic phase in the surface layer. In addition, some embodiments are characterized in that the surface layer has a molded surface finish, an absence of plastic deformation or cracks characteristic of surface grinding, or a surface contour unshaped by surface grinding. The surface layer can range from a few microns to 3–5 mm in thickness.

As shown in FIGS. 2a and 2b, the present invention provides significant improvements in wear characteristics of surface regions of PSZ. These advantages are achieved by a heat treatment process which can often be performed in a quick, reliable, manner, without substantially altering exterior dimensions. External heating can be used in accordance with this invention even with thin layers of PSZ that would be damaged or even destroyed by surface grinding. For this reason, this invention is well-suited for use with workpieces which include a deposited, coated, or molded layer of PSZ on a surface. Furthermore, the amount of thermally induced transformation in the treated surface of the PSZ can be controlled precisely with this invention by properly adjusting the temperature and time duration of the heat treatment process. As one example, this invention can be used to improve the wear characteristics of an extrusion die formed in whole or part of PSZ.

Of course, a wide range of changes and modifications can be made to the preferred embodiments discussed above. It is, therefore, intended that the foregoing description of preferred embodiments be regarded as illustrative rather than limiting, and that it be understood that this in the following claims, including all equivalents, which are intended to define the scope of this invention.

I claim:

1. A method for improving mechanical surface properties of a rigid body comprising partially stabilized zirconia as a constituent, said method comprising the following steps:
   (i) providing a rigid body having an exposed surface and an interior volume, said surface including at least one exposed surface region of partially stabilized zirconia;
   (ii) subjecting the exposed surface region of partially stabilized zirconia to external heating to heat the exposed surface region to 1100° C.–1600° C. without heating the interior volume above 500° C.–800° C.; and
   (iii) cooling said rigid body to a temperature of less than 500° C. to cause a portion of the exposed surface region to transform from the tetragonal lattice modification to the monoclinic lattice modification, thereby creating a compressive stress field in the exposed surface region and improving the mechanical surface properties of the exposed surface region.

2. The method of claim 1 wherein step (ii) comprises the step of directing radiant energy against the exposed surface region to heat the region.

3. The method of claim 2 wherein the radiant energy is generated by a laser.

4. The method of claim 1 wherein 5 percent to 100 percent of the exposed surface region of the cooled rigid body is in the monoclinic lattice modification.

5. The method of claim 1 wherein the rigid body comprises a sintered body of partially stabilized zirconia which comprises both the exposed surface region and the interior volume.

6. The method of claim 1 wherein the rigid body is a composite which comprises a first phase comprising partially stabilized zirconia and at least one additional phase.

7. The method of claim 1 wherein the interior volume comprises partially stabilized zirconia, and wherein a greater percentage of the exposed surface region than the interior volume of the cooled rigid body is in the monoclinic lattice modification.

8. The product produced by the process of claim 1.

9. A method for improving wear characteristics comprising:
   (i) providing a rigid body having an exposed surface and an interior volume, said surface including at least one exposed surface region comprising partially stabilized zirconia characterized by first and second lattice modifications, wherein the first lattice modification is lower in density than the second lattice modification, and wherein cycling the partially stabilized zirconia from a first, lower temperature to a second, higher temperature and back to the first temperature increases the proportion of the partially stabilized zirconia in the first lattice modification, and, therefore, the volume of the partially stabilized zirconia;
   (ii) externally heating the exposed surface region from the first temperature to the second temperature without inducing substantial phase transformations in the interior volume; and
   (iii) cooling the exposed surface region from the second temperature to the first temperature to increase the proportion of the partially stabilized zirconia in the first lattice modification, thereby increasing the volume of the partially stabilized zirconia and creating a compressive stress field in the exposed surface region and improving the mechanical surface properties of the exposed surface region.

10. The method of claim 9 wherein step (ii) comprises the step of directing radiant energy against the exposed surface region to heat the region.

11. The method of claim 10 wherein the radiant energy is generated by a laser.

12. The method of claim 9 wherein the first lattice modification is the monoclinic lattice modification, and wherein 5 percent to 100 percent of the exposed surface region of the cooled rigid body is in the monoclinic lattice modification.

13. The method of claim 9 wherein the rigid body comprises a sintered body of partially stabilized zirconia which comprises both the exposed surface region and the interior volume.

14. The method of claim 9 wherein the rigid body is a composite which comprises a first phase comprising partially stabilized zirconia and at least one additional phase.

15. The method of claim 9 wherein both the exposed surface region and the interior volume comprise partially stabilized zirconia, and wherein a greater percentage of the exposed surface region than the interior volume is in the monoclinic lattice modification after step (iii).

16. The product produced by the process of claim 9.

17. In a ceramic body comprising a first exposed region of a partially stabilized zirconia, and a second region of a partially stabilized zirconia at an interior portion of the ceramic body, the improvement comprising said ceramic body
   having in the first, exposed region a greater percentage of the monoclinic lattice modification than in the second region;
   having in the first, exposed region 5 percent to 100 percent in the monoclinic lattice modification; and
   having a molded surface finish in the first, exposed region;

said first, exposed region being subjected to a compressive field resulting from the greater percentage of the monoclinic lattice modification.

18. The method of claim 17 wherein the first and second regions are included in a monolithic mass of partially stabilized zirconia.

19. The method of claim 17 wherein the ceramic body is a composite body which includes at least one phase in addition to partially stabilized zirconia.

20. In a ceramic body comprising a first exposed region of a partially stabilized zirconia, and a second region of a partially stabilized zirconia at an interior portion of the ceramic body, the improvement comprising said ceramic body having in the first, exposed region a greater percentage of the monoclinic lattice modification than in the second region;

having in the first, exposed region 5 percent to 100 percent in the monoclinic lattice modification; and having a surface contour of the first, exposed region unshaped by mechanical action which induces mechanical stresses in the first region;

said first, exposed region being subjected to a compressive field resulting from the greater percentage of the monoclinic lattice modification.

21. The ceramic body of claim 20 wherein the first and second regions are included in a monolithic mass of partially stabilized zirconia.

22. The ceramic body of claim 20 wherein the ceramic body is a composite body which includes at least one phase in addition to partially stabilized zirconia.

23. The ceramic body of claim 20 wherein the first, exposed region has a molded surface finish.

24. The ceramic body of claim 20 wherein the first, exposed region has a coated surface finish.

25. The ceramic body of claim 20 wherein the first, exposed region has a deposited surface finish.

* * * * *

UNITED STATES PATENT AND TRADEMARK OFFICE
CERTIFICATE OF CORRECTION

PATENT NO. : 4,703,024
DATED : Oct. 27, 1987
INVENTOR(S) : Victor A. Aronov

It is certified that error appears in the above-identified patent and that said Letters Patent is hereby corrected as shown below:

IN THE CLAIMS

In Claim 18 (column 7, line 4), please delete "method" and substitute therefor --ceramic body--;

In Claim 19 (column 7, line 7) please delete "method" and substitute therefor --ceramic body--.

Signed and Sealed this

Twenty-fifth Day of October, 1988

Attest:

DONALD J. QUIGG

*Attesting Officer*  *Commissioner of Patents and Trademarks*